US006065843A

United States Patent [19]
Martinez, Sr.

[11] Patent Number: 6,065,843
[45] Date of Patent: *May 23, 2000

[54] THIN FILM MIRROR FRAME

[76] Inventor: Eugene Eustaquio Martinez, Sr., 3 Woodbine Rd., Irvington, N.Y. 10533

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/089,158

[22] Filed: Jun. 2, 1998

Related U.S. Application Data

[63] Continuation-in-part of application No. 08/606,367, Feb. 23, 1996.

[51] Int. Cl.[7] ..................................................... G02B 5/08
[52] U.S. Cl. ............................. 359/847; 359/883; 40/603
[58] Field of Search .................................... 359/870, 883, 359/884, 847, 846, 848; 40/603, 604

[56] References Cited

U.S. PATENT DOCUMENTS

| | | |
|---|---|---|
| 1,060,447 | 4/1913 | Geisler . |
| 3,180,220 | 4/1965 | Jeffree . |
| 3,552,835 | 1/1971 | Benzies . |
| 3,608,179 | 9/1971 | Jeffree et al. . |
| 3,687,524 | 8/1972 | Martinez . |
| 3,733,116 | 5/1973 | Hutchinson . |
| 3,757,479 | 9/1973 | Martinez . |
| 3,792,917 | 2/1974 | Martinez . |
| 3,877,139 | 4/1975 | Martinez . |
| 3,880,500 | 4/1975 | Kojabashian . |
| 3,936,159 | 2/1976 | Pavenick . |
| 3,973,834 | 8/1976 | Penn et al. . |
| 4,288,146 | 9/1981 | Johnson, Jr. et al. . |
| 4,422,723 | 12/1983 | Williams, Jr. et al. . |
| 4,483,323 | 11/1984 | Murphy . |
| 4,822,155 | 4/1989 | Waddell . |
| 4,902,085 | 2/1990 | Murzkoshi et al. . |
| 5,014,174 | 5/1991 | Won et al. . |
| 5,210,654 | 5/1993 | Williams . |
| 5,247,395 | 9/1993 | Martinez . |
| 5,467,546 | 11/1995 | Kovalak, Jr. ............................ 40/603 |
| 5,680,262 | 10/1997 | Soliday et al. . |
| 5,841,595 | 11/1998 | Martinez ............................ 359/847 |

*Primary Examiner*—Cassandra Spyrou
*Assistant Examiner*—Mark A. Robinson
*Attorney, Agent, or Firm*—Darby & Darby

[57] ABSTRACT

The present invention is a frame used to support a thin mirrored film. The frame has a front surface which includes a peripheral supporting ridge and an adhering surface. The adhering surface is located adjacent to and outside the peripheral ridge. The film is positioned tautly across the frame, supported by the peripheral ridge and attached to the frame at the adhering surface. The adhesive used to secure the film to the frame is preferably flexible so that it may provide relative lateral movement between the frame and the film, thereby compensating for thermal expansion and contraction differences between the frame and the film. A rear surface of the frame may include a peripheral stacking ridge. The stacking ridge is positioned outwardly from the peripheral supporting ridge relative to the central region so that one frame assembly may be stacked on top of another frame assembly without contacting the tautly supported film that is stretched across its peripheral supporting ridge.

37 Claims, 2 Drawing Sheets

THIN FILM MIRROR FRAME

COPENDING PATENT APPLICATIONS

This is a continuation-in-part patent application based on a patent application entitled: THIN FILM MIRROR FRAME, Ser. No. 08/606,367, filed Feb. 23, 1996, now U.S. Pat. No. 5,841,595, the disclosure of which is hereby incorporated by reference.

BACKGROUND OF THE INVENTION

1. Field of the Invention

This invention relates generally to structures for supporting reflective surfaces, and more particularly, to frame arrangements for supporting reflective surfaces made from a thin film material.

2. Discussion of the Related Art

The use of glass to support a layer of metal has been known for centuries to provide a good reflective surface, i.e., a mirror. However, these glass mirrors are inherently fragile and, therefore, are not always appropriate for use in certain unattended environments, in particular, in public areas such as public and school washrooms, gymnasiums, and locker rooms. These unattended or otherwise public areas are among those which are prone to vandalism, and experience has shown that anything breakable located in these areas will eventually be "tested" by such vandals. For at least this reason, conventional glass mirrors are rarely used in these harsh environments. Not only is the glass easily breakable, the resulting glass fragments and shards from a glass-type mirror may cause serious injury and must be carefully removed as soon as possible. To provide a reflective surface in such harsh environments, non-breakable alternatives to glass mirrors are typically used, such as polished metal plates, as detailed below.

Glass mirrors have also been used in optical systems and devices, such as large-screen, rear-projection type television sets wherein an image is projected against a reflective surface onto a viewing screen. Unfortunately, however, the mirrored glass structures used in these devices are both delicate and heavy, and are prone to breaking during shipment, handling, or even during the manufacture of the optical device. These problems are magnified as the demand for larger televisions increases, requiring a larger mirror. If a glass mirror is used for a large television, the mirror will have to be thick to sufficiently support the large surface area of the glass plate. As the thickness of the glass increases, the quality of the reflected image signal decreases.

Another problem associated with glass mirrors is that during the manufacture of the plate glass used with such mirrors, the glass is susceptible to a variety of localized imperfections and its thickness is often difficult to maintain within an acceptable range. Any imperfection inherited by the glass mirror may cause unpredictable distortion to the image signal.

During the development of these large rear-projection type television sets, polished metal plates contemplated to be were used in place of the glass mirrors to provide a reflective surface which overcame the handling and breakage problems associated with the use of glass in the earlier versions. Although the metal plates proved to be essentially unbreakable and were somewhat lighter, the quality of the reflective surface created by the polished plates was significantly reduced, and an unacceptable portion of the image signal was either absorbed or diffused. The result was a significant loss of image light reaching the viewing screen, making the image appearing on the television screen to appear dark and fuzzy.

Another problem associated with the use of polished plates of metal in place of glass mirrors is that the metal plates are sensitive to changes in temperature and can easily become warped, or otherwise thermally damaged, resulting in a distorted reflected image.

To try to overcome these deficiencies, glassless mirrors have been developed that use a thin reflective film supported by a rigid frame structure. U.S. Pat. No. 3,880,500 discloses a mirror having a thin reflective film stretched over and supported by a rectangular frame. The thin film consists of a plastic sheet with a vacuum-deposited reflective layer of metal on one surface. The metal layer is directed inwardly so that the actual reflective surface lies at the boundary between the metal layer and the plastic film.

Although such thin-film mirrors work generally well providing a low cost, safe, and lightweight mirror, such metalized films have an inherent sensitivity to changes in temperature. Since the film is stretched across a metal frame, both the film and the frame will expand and contract in response to ambient temperature. Owing to the differences in size, shape, thermal characteristics, and material, the frame and film will each react differently to changes in temperature. With conventional frames assemblies, the film will effectively contract and possible tear as the frame expands, or will effectively expand while the frame contracts, at which point, the film will create wrinkles or will otherwise distort. Depending on the size of the frame and the material that the frame is made from, these problems associated with the film contracting or expanding may not be noticed. Thus, for example, for relatively small frames (e.g., those frames under 2'×2'), the problems associated with the differences in thermal expansion are negligible.

It is, therefore, an object of the invention to provide a frame-supported metalized film mirror that overcomes the deficiencies of the prior art.

It is another object of the invention to provide such a mirror which includes means for compensating for differences in thermal characteristics between the metalized film and the frame.

SUMMARY OF THE INVENTION

The present invention is directed to a frame used to support a thin mirrored film. The frame has a front surface which includes a peripheral supporting ridge and an adhering surface. The adhering surface is located adjacent to and outside the peripheral ridge. The film is positioned tautly across the frame, supported by the peripheral ridge and attached to the frame at the adhering surface. The adhesive used to secure the film to the frame is preferably flexible so that it may provide relative lateral movement between the frame and the film, thereby compensating for thermal expansion and contraction differences between the frame and the film.

A rear surface of the frame optionally includes a peripheral stacking ridge, if, for example, a large number of frames are being shipped. The stacking ridge is positioned outwardly from the peripheral supporting ridge relative to the central region so that one frame assembly may be stacked on top of another frame assembly without contacting the tautly supported film that is stretched across its peripheral supporting ridge.

BRIEF DESCRIPTION OF THE DRAWINGS

Further features of the present invention will become readily apparent from the following detailed description of the invention taken in conjunction with the accompanying drawings, in which.

DETAILED DESCRIPTION OF THE PREFERRED EMBODIMENTS

Figure 1:
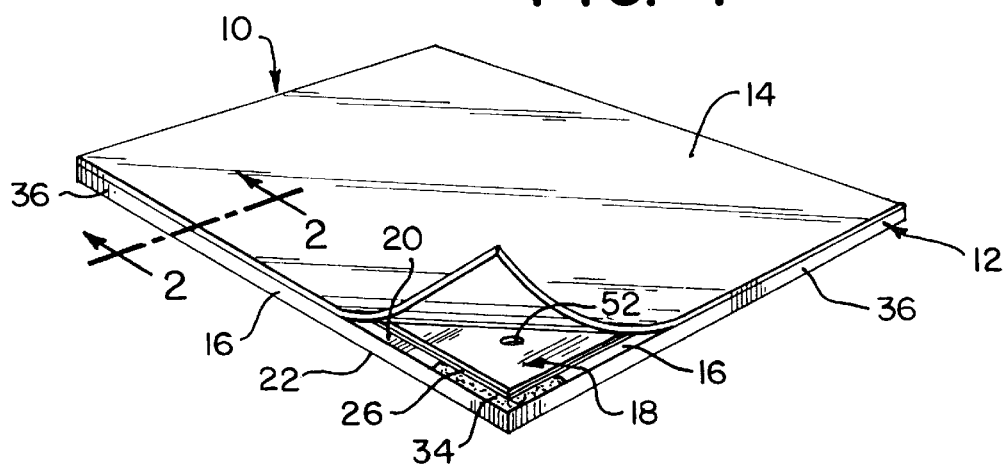
FIG. 1 is a perspective view of a frame assembly, according to the invention.

Referring FIG. 1, a lightweight frame assembly 10 is shown including a frame 12, and a thin mirrored film 14. Frame 12 may be formed as a single piece, or may be made from a number of separately formed frame members 16. Frame assembly 12 is preferably trapezoidal or rectangular, but may be circular, triangular, octagonal, or any other shape which defines a central region 18. Frame 12 is preferably formed from extruded aluminum and includes a front surface 20 and an opposing rear surface 22. Frame 12 is preferably attached around the perimeter of a pre-shaped rigid foam core 24. Foam core 24 is used to provide structural rigidity to frame assembly 10 and to protect the reflective surface of frame assembly, as described below.

Although the present invention frame 12 is intended for supporting a thin mirrored film 14, frame assembly 10 may also be used to support any flat panel or film, including decorative films, posters, pictures, maps, and signs. However, for ease of illustration only, the preferred embodiment of the present invention is described hereinbelow with reference to a thin film mirrored panel.

Figure 2:
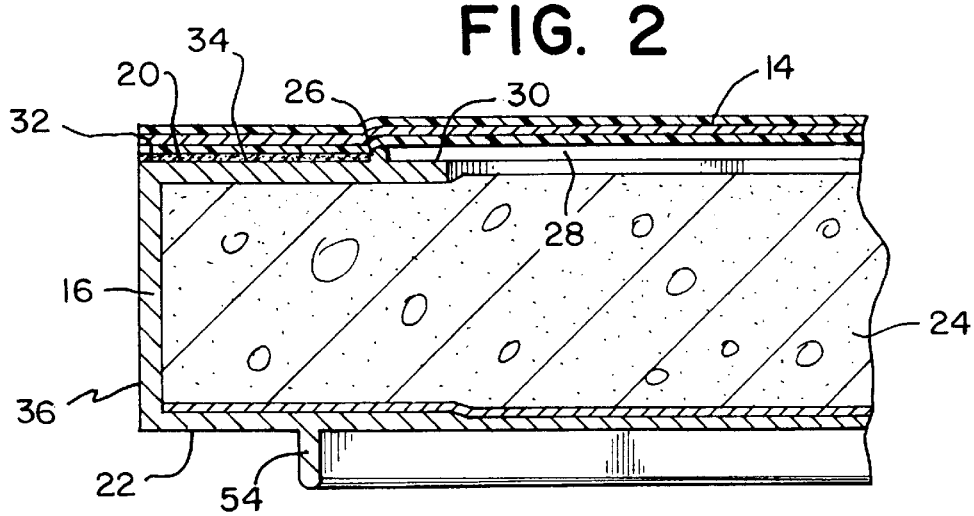
FIG. 2 is a sectional view of the frame assembly, taken along line 2—2 of FIG. 1, showing details of a frame, a foam core, a peripheral supporting and stacking ridge, and a thin mirrored film, according to the invention.

Referring to FIGS. 1 and 2, and as will be further described below, a thin metalized film 14 is stretched across central region 18 to provide a truly flat reflective (mirrored) outer surface on front surface 20 of frame 12. Frame 12 includes a peripheral supporting ridge 26, which extends along its periphery and projects above front surface 20 by a predetermined distance. Supporting ridge 26 is configured to tightly support thin metalized mirror film 14 such that there is an air gap 28 disposed between central region 18 and film 14. Ridge 26 raises and supports film 14 over central region 18 so that it does not contact an inner peripheral surface 30 of front surface 20 of frame 12, thereby ensuring that film 14 will be stretched within a single plane and be free of wrinkles or other imperfections. For example, if film 14 were to contact front surface 20 inwardly from ridge 26, film 14 would no longer be truly planar and would distort, thus lessening the quality of the reflective surface.

Although shown in the figures, surface 30 of frame 12 which extends inwardly from ridge 26 on front surface 20, is not a necessary element of frame 12. Surface 30 permits frame 12 to be built in a balanced extrusion process and further helps rigidify frame assembly 10 by adding a greater surface area to contact foam core 24.

Frame assembly 12 includes an outer area 32 which is located outside ridge 26, relative to central region 18. A portion of film 14 is attached to outer area 32 using an adhesive 34, as described below, to attached film 14 to frame 12.

Figure 4:
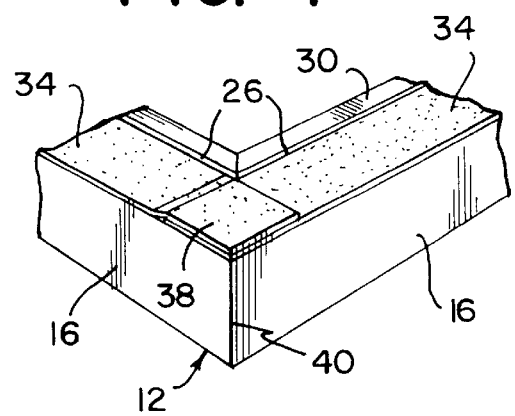
FIG. 4 is a perspective view of a corner portion of the frame assembly, showing the frame assembly without the film.

According to the invention, adhesive 34 preferably remains flexible after it cures so that the resiliency of adhesive 34 compensates for any lateral movement between film 14 and frame assembly 10 due to differences in thermal expansion. A preferred adhesive 34 is double-sided pressure-sensitive tape, which would be sized to fit against outer area 32 between ridge 26 and the outermost peripheral edge of frame 12. Depending on the shape of frame 12, it is preferred that tape adhesive would either overlap at each corner, as shown in FIG. 4, or cut to abut against the tape adhesive of an adjacent side of frame 12 and not overlap, as one skilled in the art would readily recognize. In the latter case, tape adhesive 34 may include a straight cut, a miter cut at 45 degrees, or any other appropriate angle, to ensure that tape adhesive 34 covers outer area 32 so that the entire perimeter of film 14 (lying adjacent to outer area 32) is secured to frame assembly 12. Although pressure-sensitive tape is preferred as adhesive 34, any appropriate flexible adhesive that secures film 14 to frame 12 while compensating for lateral movement between film 14 and frame 12 may be used. Other suitable adhesives include, for example, transfer tape, silicone-based adhesives, acrylic adhesives, rubber-based adhesives, such as rubber cement, etc. Additionally, while one layer of pressure-sensitive tape is preferred as adhesive 34, more than one layer may be used so long as the height of the adhesive is less than the height of ridge 26.

Figure 7:
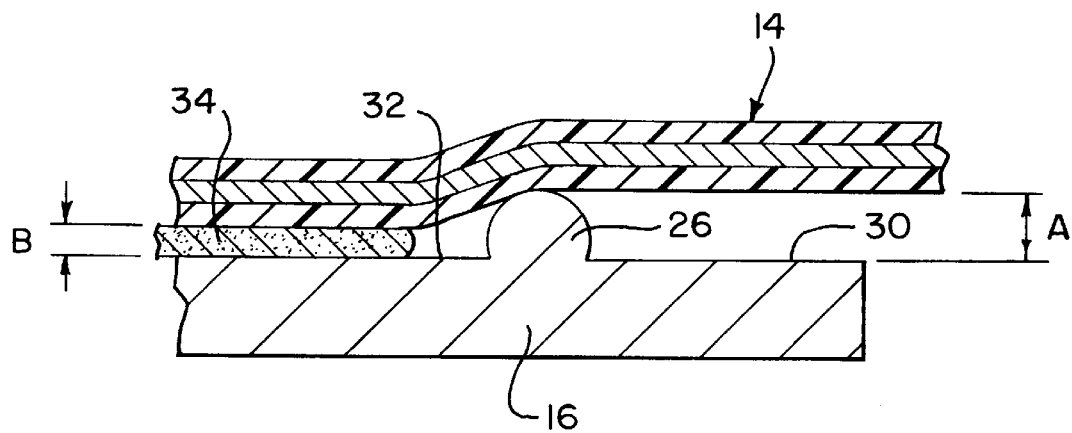
FIG. 7 is an enlarged view of a portion of the frame assembly shown in FIG. 6, showing details of the adhesive, film, and peripheral supporting ridge, according to the invention.

According to the preferred embodiment of the invention, ridge 26 is higher (defined as the distance the ridge extends from front surface 20 of frame 12, see distance A in FIG. 7) than the thickness (or height) of adhesive 34 (see distance B in FIG. 7), which ever one is used. For example, if transfer tape is used as adhesive 34 having a thickness of about 0.002 inches, the preferred height of ridge 26 is about 0.020–0.030 inches. Ridge 26 must be sufficiently high from frame 12 to raise film 14 above adhesive 34 to ensure a true and flat reflective plane, yet not be so high to form too steep an angle between film 14 and adhesive 34. If ridge 26 is too high, film 14 may lift from outer area 32 and possible separate from frame 12.

Frame 12 includes side walls 36 which may also be used as an adhesive surface.

As shown in FIG. 4, if tape is used as adhesive 34, the tape will have end portions 38. It is preferred that end portions 38 overlap one another at the corner portions 40 of the frame 12. Preferably, the height of the overlapped portions of tape 34 (twice the thickness of the tape) at the corner portions 40 is less than the distance A of supporting ridge 26 (see FIG. 7).

The overlapping of the pressure-sensitive tape 34, avoids or minimizes the forming of a compound curve of film 14 at corner portions 40 of frame 12. In other words, the overlapping of tape 32 in the corners of the frame lifts film 14 closer to the height of ridge 26 to ensure that film 14 is free of wrinkles in the corner area. This is especially important in the corners of the frame because the film is not as flexible in the corners. It is also important to maintain tight tolerance with respect to the co-planar nature of the entire supporting ridge 26 such that film 14 will be planar when adhered to adhesive 34 surrounding securing ridge 26. According to the invention, film 14 is first stretched a predetermined amount and then pushed against adhesive 34. Thus, it is preferable to adhere film 14 to frame 12 in a taut or stretched condition. Once stretched, mirrored film 14 provides a high quality reflective mirror surface. If necessary, when using a thermosetting polyester-based film, the assembly 10 may be subjected to a heat treatment to further tension the film.

Figure 5:
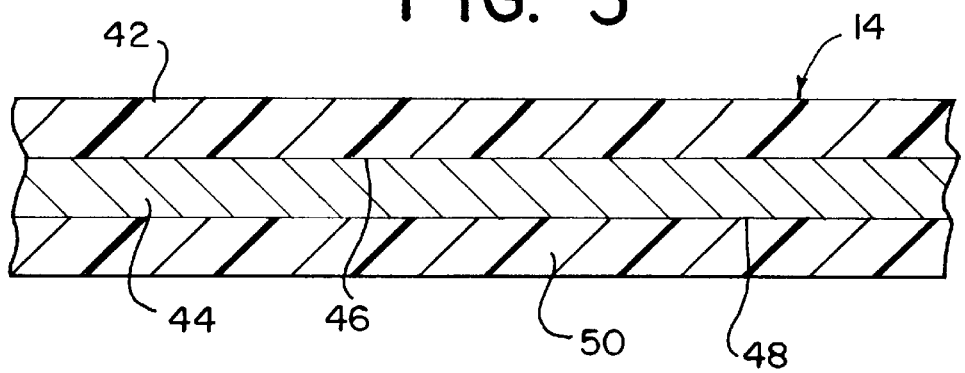
FIG. 5 is an enlarged partial view of a thin mirrored film, according to another embodiment of the invention.
Figure 6:
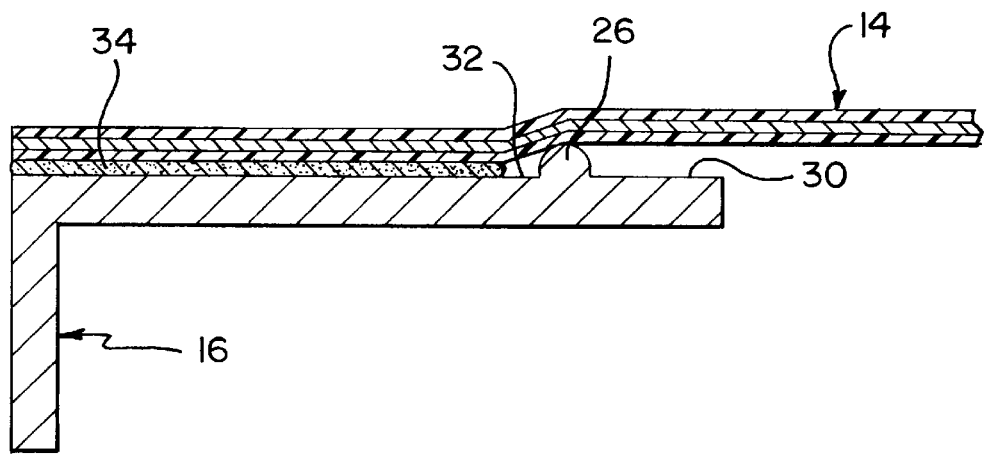
FIG. 6 is a partial sectional view of the frame assembly, showing details of an adhesive used to secure the film to the frame.

Referring to FIG. 5, a mirrored film 14, according to the invention, is shown including a substrate 42 made from a clear plastic such as a polyamide or polyester, (e.g. polyethylene terephthalate). Of course, other types of plastic films may be used, as understood by those skilled in the art. To give film 14 reflective characteristics, substrate 42 is coated with a reflective layer 44 which is preferably aluminum, but other materials such as silver and chromium can be used. As understood by those skilled in the art, reflective layer 44 may be applied to a reflective surface 46 of substrate 42 using, for example, a vacuum deposition process, a sputtering process or an electron beam process. The rear surface 48 of reflective layer 44 is preferably protected against handling and the environment by a protective layer 50 which may be similar to substrate 42, i.e., clear plastic. If reflective layer 44 is made of aluminum, protective layer 50 is preferably acrylic or vinyl and can be applied in one or several coats to achieve complete coverage of reflective layer 44. If reflective layer 44 is, for example, made of silver, the protective layer 50 is preferably stainless steel, gold or chromium, and is applied by a sputtering process, such as described in U.S. Pat. No. 4,666,263 to Petcavich, the disclosure of which is hereby incorporated by reference.

Referring to FIGS. 1–2, since film 14 is supported a predetermined distance above frame 12 by ridge 26, air space 28 is created between film 14 and foam core 24. Since the air in this space would otherwise be trapped between foam core 24 and film 14, this air space 28 is preferably vented to the surrounding atmosphere by providing vent holes 52 within foam core 24, as shown in FIG. 1. This ventilation is necessary to compensate for surrounding air pressure changes, which would distort the stretched film 14 if the enclosed inner area 28 was sealed. Unfortunately, venting air space 28 also exposes the rear surface of film 14 to possible environmental damage, such as damage relating to moisture, dust, and possibly salt.

In the preferred embodiments, substrate 42 has a thickness between 0.0005–0.01 inches, preferably between 0.001 and 0.005 inches. Substrate 42, which preferably faces away from frame 12 and is, therefore, exposed to the environment, also protects the reflective metal layer 44 from environmental damage. Also, protective coating 50 may be used in place of adhesive 34 to secure film 14 to frame 12, however, according to the invention, adhesive 34 preferably provides flexibility to compensate for any lateral movement between film 14 and frame 12.

Figure 3:
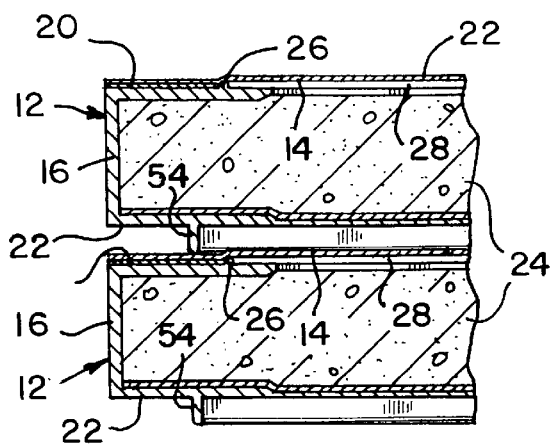
FIG. 3 is a partial sectional view of two frame assemblies, each similar to the frame assembly shown in FIG. 2, showing details of the stacking ridge supporting an upper frame assembly against the frame of a lower frame assembly, according to the invention.

Referring to FIGS. 2 and 3, depending on the size and application of the frame assembly 10, rear surface 22 of each frame member 16 includes a protruding stacking ridge 54 located generally parallel to the longitudinal axis of each frame member 16. Stacking ridge 54 protrudes a predetermined distance from rear surface 22 of frame member 16. Stacking ridge 54 is positioned outwardly from supporting ridge 26 relative to the central region 18 such that a frame assembly 12 may be stacked on top of another frame assembly without contacting the delicate film supported between ridge 26 of the lower frame assembly 12. One advantage to providing stacking ridge 54 is that several frame assemblies may be safely handled and shipped together. Stacking ridge 54 minimizes the likelihood of damage during shipping. Additionally, stacking ridge 54 provides a compression force between the film 14 and front surface 20 to ensure good adhesive contact.

While the embodiments shown and described are fully capable of achieving the objects and advantages of the invention, it is to be understood that these embodiments are shown and described solely for the purpose of illustration and not for limitation. It is contemplated that many changes and modifications may be made to the present invention without departing from the spirit and scope of the invention as disclosed above.

What is claimed is:

1. A frame assembly, comprising:

a frame member defining a central region, said frame member including a front surface;

a supporting ridge located along said frame member on said front surface, said supporting ridge spaced inwardly from the periphery of said frame member and protruding from said front surface by a predetermined distance; and a sheet of film including a first portion supported by said supporting ridge and extending across the central region in a film plane, and a second portion adhered to said front surface by an adhesive, said first portion being substantially parallel to said second portion.

2. A frame as recited in claim 1, wherein said frame includes four supporting members.

3. A frame as recited in claim 1, wherein said adhesive is a double-sided pressure-sensitive tape.

4. A frame as recited in claim 3, wherein said predetermined distance is greater than the thickness of said double-sided pressure-sensitive tape.

5. A frame as recited in claim 3, wherein said adhesive includes a plurality of pieces of double-sided pressure sensitive tape which overlap in a corner of said frame member.

6. A frame as recited in claim 5, wherein the height of said overlapped portion of tape at said corner of said supporting member is less than said predetermined distance.

7. A frame as recited in claim 3, wherein said adhesive includes a plurality of pieces of double-sided pressure sensitive tape which abut in a corner of said frame member.

8. A frame as recited in claim 1, wherein said adhesive is transfer tape.

9. A frame as recited in claim 1, wherein said adhesive is rubber based.

10. A frame as recited in claim 9, wherein said rubber based adhesive includes a rubber cement.

11. A frame as recited in claim 1, wherein said adhesive includes a silicone-based adhesive.

12. A frame as recited in claim 1, wherein said film comprises a mirror film having three layers, a first of said layers being a thin plastic film material, a second of said layers being a reflective material, and a third of said layers being a protective coating, said second layer being bonded between said first and third layers, said frame defining an aperture in said central region such that said third layer is exposes to the atmosphere.

13. A frame as recited in claim 12, wherein said third layer adheres to said adhesive.

14. A frame as recited in claim 1, wherein said film comprises a mirror film having two layers, a first of said layers being a thin plastic film material, and a second of said layers being a reflective material, said second layer being bonded to said first layer, said frame defining an aperture in said central region such that said second layer is exposed to the atmosphere.

15. A frame as recited in claim 1, wherein said frame member includes a rearward surface having a stacking ridge located substantially parallel to the periphery of said frame member and protruding from said rearward surface by a predetermined distance.

16. A frame as recited in claim 15, wherein said stacking ridge is positioned outwardly from said supporting ridge relative to said central region such that said frame is configured to be stacked atop a forward surface of another of said frame without contacting the supported film of said another frame.

17. A frame assembly as recited in claim 1, wherein said supporting ridge is a highest point protruding from said front surface of said frame member.

18. A frame defining a central region for supporting a film across said central region in a film plane, said frame comprising:
    at least one supporting member having a forward surface including an adhering surface portion;
    a supporting ridge located on said forward surface and spaced inwardly from the periphery of the at least one supporting member, said supporting ridge being generally parallel to the periphery of the at least one supporting member and positioned intermediate said adhering surface portion and said central region, said supporting ridge protruding from said forward surface by a predetermined distance and being adapted to support said film across said central region in said film plane; and
    an adhesive provided on said adhering surface portion to adhere said film to said adhering surface portion, said film adhered to said adhering surface portion being substantially parallel to said film plane.

19. A frame as recited in claim 18, wherein said supporting ridge extends along the entire periphery of said at least one supporting member.

20. A frame as recited in claim 18, wherein said frame includes a plurality of supporting members joined together in a polygonal arrangement.

21. A frame as recited in claim 20, wherein said frame includes four supporting members.

22. A frame as recited in claim 18, wherein said adhesive includes transfer tape.

23. A frame as recited in claim 18, wherein said adhesive includes liquid adhesive.

24. A frame as recited in claim 18, wherein said adhesive includes double-sided pressure-sensitive tape.

25. A frame as recited in claim 24, wherein said predetermined distance is greater than the thickness of said double-sided pressure sensitive tape.

26. A frame as recited in claim 24, wherein said adhesive includes a plurality of pieces of double-sided pressure sensitive tape which overlap in a corner of said at least one supporting member.

27. A frame as recited in claim 26, wherein the height of said overlapped portion of tape at said corner of said at least one supporting member is approximately equal to said predetermined protruding distance of said supporting ridge.

28. A frame as recited in claim 18, wherein said film comprises a mirror film having three layers, a first of said layers being a thin plastic film material, a second of said layers being a reflective material, and a third of said layers being a protective coating, said second layer being bonded between said first and third layers, said frame defining an aperture in said central region such that said third layer is exposed to the atmosphere.

29. A frame as recited in claim 28, wherein said third layer adheres to said adhesive.

30. A frame as recited in claim 18, wherein said at least one supporting member includes a rearward surface having a stacking ridge located generally parallel to the periphery of said at least one supporting member and protruding from said rearward surface by a predetermined distance.

31. A frame as recited in claim 18, wherein said supporting ridge is a highest point protruding from said forward surface of said supporting member.

32. A display panel comprising:
    a frame defining a central region, said frame including;
        (i) at least one supporting member having a forward surface including an adhering surface portion, and a longitudinal axis;
        (ii) a supporting ridge located on said forward surface and spaced inwardly from the periphery of the at least one supporting member, said supporting ridge being generally parallel to said longitudinal axis and positioned intermediate said adhering surface portion and said central region, said supporting ridge protruding from said forward surface; and
        (iii) a panel adhesive provided on said adhering surface portion; and
    a decorative panel including a first portion supported by said supporting ridge such that said decorative panel is supported across said central region, and a second portion adhered to said adhering surface portion by said adhesive, said first portion being substantially parallel to said second portion.

33. A display panel as recited in claim 32, wherein said supporting ridge is a highest point protruding from said forward surface of said supporting member.

34. A frame assembly, comprising:
    a frame member having an inner periphery edge defining a central region and an outer periphery edge, said frame member including a continuous substantially planar front surface extending from said inner periphery edge to said outer periphery edge;
    a supporting ridge located along said frame member on said front surface, said supporting ridge, spaced inwardly from the periphery of said frame member and protruding from said front surface by a predetermined distance; and
    a sheet of film including a first portion supported by said supporting ridge and extending across the central region in a film plane, and a second portion adhered to said front surface by an adhesive, said first portion being substantially parallel to said second portion.

35. A frame assembly, comprising:
    a frame member defining a central region and a film plane, said frame member including a front surface; and
    a sheet of film supported by said front surface and attached to said frame member by an adhesive;
    wherein said frame member includes a rearward surface having a stacking ridge located generally parallel to the periphery of said frame member and protruding from said rearward surface by a predetermined distance, said stacking ridge is positioned outwardly relative to said central region so that when stacked atop another frame said stacking ridge rests on a front surface of said another frame without contacting the supported film of said another frame.

36. A frame as recited in claim 35, wherein said adhesive is flexible so that said film may move laterally a predetermined amount with respect to said frame member without detaching from said frame member to compensate for thermal expansion and contraction differences between said frame member and said film.

37. A frame as recited in claim 36, wherein said adhesive is a double-sided pressure-sensitive tape.

* * * * *